A. LOBDELL.

CORDING ATTACHMENT FOR SEWING MACHINES.

No. 9,839. Reissued Aug. 16, 1881.

Witnesses.

W. S. Graham.

John McCauley

Inventor.

Alonzo Lobdell

By

Stout & Underwood,

Attorneys.

N. PETERS, Photo-Lithographer, Washington, D. C.

UNITED STATES PATENT OFFICE.

ALONZO LOBDELL, OF RACINE, WISCONSIN.

CORDING ATTACHMENT FOR SEWING-MACHINES.

SPECIFICATION forming part of Reissued Letters Patent No. 9,839, dated August 16, 1881.

Original No. 223,364, dated January 6, 1880. Application for reissue filed May 24, 1881.

*To all whom it may concern:*

Be it known that I, ALONZO LOBDELL, of Racine, in the county of Racine and State of Wisconsin, have invented a new and useful Cording Attachment for Sewing-Machines; and I do hereby declare that the following is a full, clear, and exact description thereof, reference being had to the accompanying drawings, and to the letters of reference marked thereon, which form a part of this specification.

My invention relates to a cording attachment for sewing-machines, designed especially for heavy work, such as carriage-cushions, upholstery, leather-working, &c.; and it consists in a device for holding the cord and covering-strip in place, and in an improved presser-foot adapted to operate in conjunction with the cord-holder, all as more fully set forth hereinafter.

Figure 1:
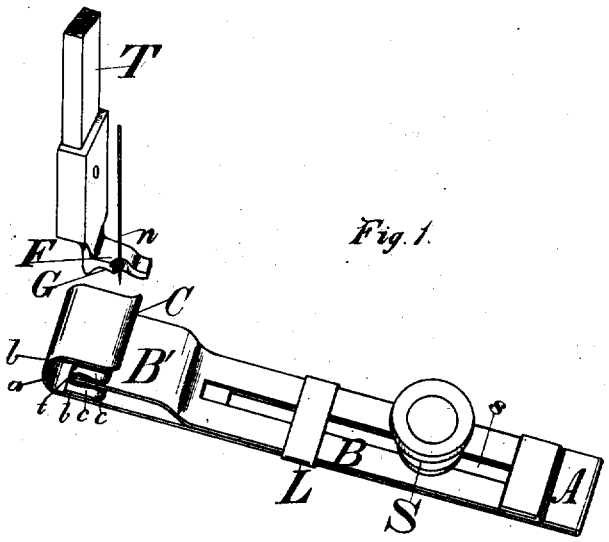
Figure 3:
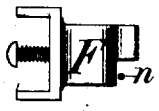
Figure 4:
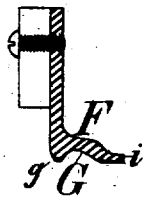
Figure 2:
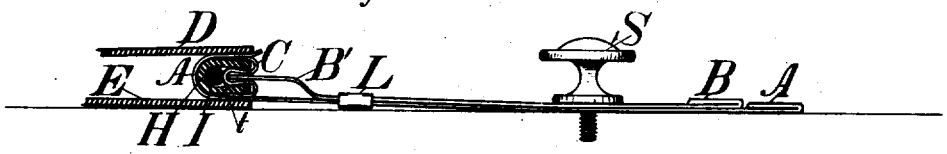

In the drawings, Figure 1 is a perspective view of my device, showing the relative positions of the cord holder and guide, presser-foot, and needle. Fig. 2 is a side elevation of the cord holder and guide, with the cord and covering-strip in place and the several fabrics in position to be joined; and Figs. 3 and 4 are detail views of the presser-foot.

A is a strip or plate of metal, bent backward at one end over a curved surface to form a groove or passage, *a*, for the reception of the cord I and covering-strip H. B is a shorter plate, of the same width as the plate A, bent at less than a right angle at B′, near one end, and then straightened again, so that this end is raised above the level of plate A, while the balance of plate B rests squarely on top of plate A, as shown. The raised end of plate B is provided with lips *b b* and tongue *t*, which I preferably form by bending a third strip of metal, C, into a W shape, (with rounded angles, as shown,) and then securing this strip upon the raised end of the plate B, so that the latter plate will fit just within the tongue *t* of the strip C and leave equal grooves *c c* above and below the tongue, as shown. These twin grooves or passages *c c* may be otherwise formed—as, for instance, directly from the raised end of the plate B, made of sufficient length for the purpose. The plates A and B are centrally and longitudinally slotted at *s* to receive the set-screw S, by which they are adjustably held together, and also held in proper position upon the bed-plate of the machine and before the needle. The loop L assists in holding the parts A and B in proper lateral relation, and serves to prevent their separation when the device is detached from the machine.

The presser-foot F (shown in plan and section in Figs. 3 and 4) is constructed with especial reference to the cord-holder. It is provided with a rounded groove, G, in its under side or bearing-surface, one wall of the said groove extending down and terminating in a beveled edge, *g*, while the other wall is extended into a nearly-horizontal bearing, as shown at *i*, and nearly one-half of this bearing-surface is cut away to receive the needle *n*.

The cording attachment is secured to the sewing-machine in front of the feed, and the presser-foot is secured on the presser-bar T, directly over the feed and parallel with the needle-bar, so that the said presser-foot bears down on the fabrics equally on both sides of the cord-ridge, and thus secures uniformity in the distance between the cord and the seam throughout their length, thereby giving perfect evenness in the protrusion of the cord when the seam is turned.

The operation of the cord holder and guide is as follows: The cord I and covering-strip H are placed in position in the holder, as shown in Fig. 2, and below the holder the fabric E is placed, with the right side uppermost next the bottom of the holder, and with the fabric D on top of the holder, with its right side down next the top of the holder, the right side of the covering-strip being, of course, next the curved wall of the holder, and its wrong side next the cord. The work being in this position, with the edges of the covering-strip H in the grooves *c c*, the plate B is pushed forward till the edges of the covering-strip strike the bottom of the grooves *c c* and the tongue *t* bears against the cord I, and then the plates A and B are secured together in this position and to the machine by means of the set-screw S. The edges of the fabrics D and E (of cloth, leather, or other suitable material) are brought in line with the edges of the cord-covering strip, and preferably maintained in proper position by hand, while the feed carries the whole under the needle, the grooved presser-foot keeping everything perfectly even, as described, and the beveled bottom edge, *g*, preventing the corded portion from slipping out of place either to the right or left.

It is obvious that my device will act as a cord-coverer, and that the top and bottom fabrics, D E, may be afterward sewed to the covering-strip, if desired; but in either case the peculiar construction of the presser-foot is especially adapted to the particular formation of the cord holder and guide, and I design to use all the parts of my device together, rather than separately.

My improvement is especially designed for heavy cording, particularly in the manufacture of carriage-cushions, which have hitherto been corded by hand. It is also adapted for enameled cloth and leather-working generally, and for the manufacture of upholstery, and is intended to be used with the ordinary sewing-machines employed for these classes of work.

Having thus described my invention, what I claim as new, and desire to secure by Letters Patent, is—

1. A presser-foot adapted for heavy cording, provided with a grooved under surface, one wall of which is extended down into a beveled edge and the other wall extended out into a toe or bearing-surface, as shown and described.

2. In combination with the presser-bar of a sewing-machine, a presser-foot hollowed out on its under side and provided with a beveled lower edge and an extended toe or bearing-surface, as set forth.

3. The combination of the presser-bar of a sewing-machine and a presser-foot hollowed out on its under side, and having a beveled lower edge and an extended toe or bearing-surface, with the cord holder or guide A B C, located in front of the feed, as set forth.

4. The combination, with the presser-foot F, constructed as described, with the cord holder and guide A B C, as and for the purpose set forth.

5. The presser-foot F, consisting of square, upright, hollow open shank, adapted to fit on and be secured to the presser-bar of a sewing-machine, and having on its under side the groove G, beveled lower edge, *g*, and extended toe or bearing-surface *i*, partially cut away, as shown, and for the purpose described.

6. The combination of the plate A, having its end bent to form the cord-passage *a*, and the plate B, provided with the tongue *t*, and the part C, with the double-fold lips *b b*, forming the grooves *c c*, substantially as and for the purposes specified.

7. The plate A, curved at its end to form the cord-passage *a*, combined with the adjustable plate B, provided at its forward end with the double-fold piece C, forming the binding-guide, adjustable with said plate B forward and backward within the curved end of plate A, and the set-screw S, whereby said adjustment is secured and the implement is attached to the sewing-machine, substantially as set forth.

8. A guide for the cord and covering-strip, composed of a plate, A, the end whereof is folded back upon itself, with a proper curve and sufficient space intervening, combined with a plate, B, folded upon itself twice in the form of the letter W and inserted within the fold of the plate A, in the manner set forth.

In testimony that I claim the foregoing I have hereunto set my hand this 20th day of May, 1881.

ALONZO LOBDELL.

Witnesses:
STANLEY S. STOUT,
HAROLD G. UNDERWOOD.